(12) United States Patent
Frederick et al.

(10) Patent No.: US 7,484,819 B2
(45) Date of Patent: Feb. 3, 2009

(54) REVEAL STRUCTURE FOR FURNITURE AND METHOD OF MAKING SAME

(75) Inventors: Kenneth Frederick, Calgary (CA); Dariusz Gorniak, Calgary (CA); Adrian Farcas, Calgary (CA); Robert Steeves, Calgary (CA)

(73) Assignee: Haworth, Ltd., Calgary, Alberta (CA)

( * ) Notice: Subject to any disclaimer, the term of this patent is extended or adjusted under 35 U.S.C. 154(b) by 79 days.

(21) Appl. No.: 11/304,388

(22) Filed: Dec. 15, 2005

(65) Prior Publication Data

US 2007/0138922 A1   Jun. 21, 2007

(51) Int. Cl.
*A47B 43/00* (2006.01)
(52) U.S. Cl. .................. 312/257.1; 312/265.5
(58) Field of Classification Search ............ 312/109, 312/263, 265.5, 265.6, 257.1; 403/292, 298
See application file for complete search history.

(56) References Cited

U.S. PATENT DOCUMENTS

| | | | | |
|---|---|---|---|---|
| 2,989,788 | A * | 6/1961 | Kessler | 403/295 |
| 3,269,455 | A * | 8/1966 | Gillotti | 160/369 |
| 3,294,464 | A * | 12/1966 | Lew | 312/258 |
| 3,325,233 | A * | 6/1967 | Oppenhuizen et al. | 312/195 |
| 3,429,631 | A * | 2/1969 | Neyroud | 312/265.4 |
| 3,612,634 | A * | 10/1971 | Moore, Jr. | 312/111 |
| 3,853,367 | A * | 12/1974 | Jamison et al. | 312/259 |
| 3,883,285 | A | 5/1975 | Hewson | |
| 3,955,864 | A * | 5/1976 | MacDonald et al. | 312/258 |
| 3,966,339 | A | 6/1976 | Nemecek et al. | |
| 4,253,204 | A * | 3/1981 | Tasaka | 5/2.1 |
| 4,635,410 | A * | 1/1987 | Chumbley | 52/63 |
| 4,836,626 | A * | 6/1989 | Taylor et al. | 312/257.1 |
| 4,963,051 | A | 10/1990 | Hutter | |
| 5,439,285 | A * | 8/1995 | Lautenschlager | 312/348.1 |
| 5,662,399 | A * | 9/1997 | Henkel et al. | 312/258 |
| 5,688,031 | A * | 11/1997 | Tryon | 312/257.1 |
| 5,772,551 | A | 6/1998 | Mabie | |
| 6,099,095 | A * | 8/2000 | Irace | 312/257.1 |
| 6,113,203 | A * | 9/2000 | Chen | 312/258 |
| 7,213,895 | B2 * | 5/2007 | Wu | 312/258 |

FOREIGN PATENT DOCUMENTS

EP          357861       *  3/1990    ............... 312/109

* cited by examiner

*Primary Examiner*—Hanh V Tran
(74) *Attorney, Agent, or Firm*—Flynn, Thiel, Boutell & Tanis, P.C.

(57) ABSTRACT

A reveal is formed on a piece of furniture by fastening a reveal frame to a front edge of a furniture body. The reveal frame is fastened to the body by plural double-ended barbed fasteners that engage both a channel in the reveal frame and a channel formed in the front edge of the body.

13 Claims, 10 Drawing Sheets

REVEAL STRUCTURE FOR FURNITURE AND METHOD OF MAKING SAME

FIELD OF THE INVENTION

The present invention relates to a reveal for an article of furniture and, more specifically, to a reveal frame construction that is easily assembled using corner connectors and double-ended barbed fasteners.

BACKGROUND OF THE INVENTION

Figure 1:
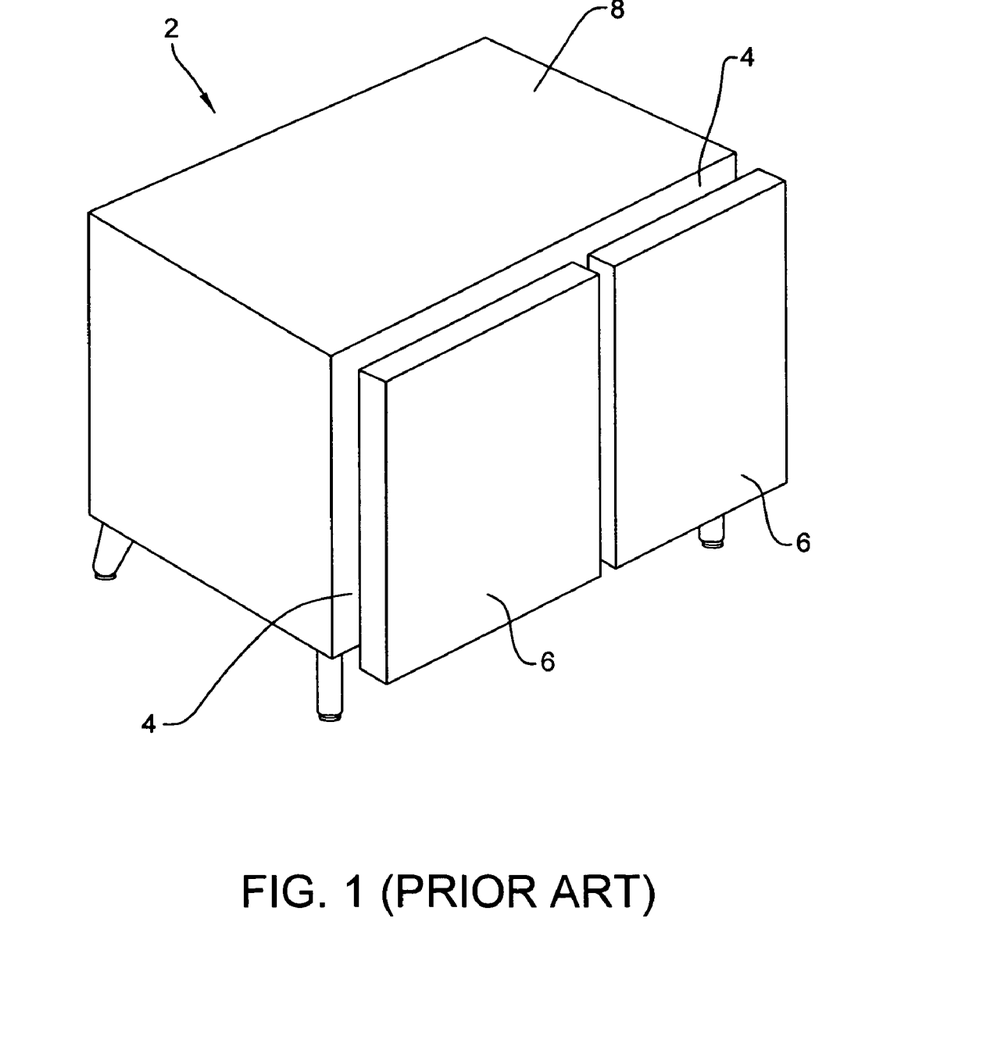
FIG. 1 is a perspective view of a conventional article of furniture having a reveal associated therewith.

Referring to FIG. 1, a furniture reveal is provided by a structure that spaces a front structural element (e.g., a door or a drawer front) of an article of furniture from its main body or housing. For example, a reveal may be implemented on furniture articles which have a cabinet provided with hinged doors or sliding drawers. The gap or groove defining the reveal, such as between the front and the main body, is frequently provided for design aspects, i.e., aesthetics, but can also provide functional aspects. The functional aspects include the ability to eliminate the need for handles or pulls on the front structural elements by enabling a user of the furniture article to manually engage the front structural elements, such as a door or drawer, by inserting fingers into the gap created by the reveal to effect opening of the door or drawer.

Conventional structures for implementing a furniture reveal have been expensive and time consuming to make. For example, a reveal is frequently implemented by machining a groove or recess into a body member such as a panel. In other cases a reveal has been implemented by forming an extra reveal frame which is interposed between the main body and the front element of the furniture article. The extra reveal frame is made according to convention frame manufacturing techniques that require many extra parts and is time consuming to assemble to the main body. What is needed is a way to manufacture a reveal frame that is economical in terms of materials and manufacturing effort, and can be easily but accurately assembled to the main body of the furniture article.

SUMMARY OF THE INVENTION

The present invention comprises a reveal frame for creating a reveal feature on an article of furniture. The frame is rectangular and is sized to have external side dimensions that are smaller than the external side dimensions of the main body or housing of the furniture article. The reveal frame has a channel cross-section with the open side of the channel facing rearward toward the main body. A dado (i.e., channel) is formed in the front face of the main body and is dimensioned to substantially match the open side of the channel in the reveal frame. The reveal frame is initially assembled from a set of four mitered channel pieces by four corner connectors that fixedly fit into the channels of adjacent channel pieces. The assembled reveal frame is affixed to the main body using plural double-sided barbed fasteners which at one end fit into the dado and at the opposed end fit into the frame channel.

An aspect of the present invention is a frame corner connector that is useful to easily and rigidly assemble contiguous frame sides at the corners. The frame side pieces have a deep channel, that is, its depth dimension is greater than its width dimension. The frame corner connector is configured to fill this deep channel by having a depth dimension that substantially matches that of the deep channel, thereby maximizing the amount of contact between the connector and the walls of the channel. The frame corner connector has a tapered configuration that effectively wedges the connector into the channel. A taper of about one-half of one degree is sufficient to provide the desired wedge effect.

Another aspect of the present invention is a double-ended barbed connector or fastener that is useful for connecting the reveal frame to the main body. The double-ended barbed connector is sized and configured to fit into the reveal frame channel and to fit into the dado formed in the front facing portion of the main body. The double-ended barbed connector is relatively thin and flat and is elongated along the direction of the channel/dado. Each end of the double-ended barbed connector has, on opposite sides thereof, plural barbs that are elongated perpendicular to the insertion direction so as to extend in the lengthwise direction of the channel or dado. Each end of the connector preferably has a pointed cross section that forms a narrow edge along each end of the connector to facilitate insertion into the channel or dado.

Yet another aspect of the present invention is a process for assembling an article of furniture using a separate frame to create a reveal. A housing or body unit and one or more front units are provided for assembly. A set of typically four side frame elements are provided, each having a channel-shaped crossed section and mitered ends. The reveal frame is assembled by connecting the four mitered-ended side frame elements by pressing deep profile, tapered frame corner connectors into the channels, thereby forming a rectangular frame with the open channel facing in a rearward direction. The corner connectors provide an irreversible interference fit with the adjacent frame channels. A channel or dado (continuous or discontinuous) is formed (i.e., machined) in a front facing portion of the housing unit to correspond to the channel opening in the rear side of the reveal frame. Plural double-ended barbed connectors are forced into the channel of the reveal frame such that for each connector one end is inserted to create a resilient interference engagement and the other end extends outwardly from the frame in a rearward direction. The outwardly projecting ends of the double-ended barbed connectors are fitted into the dado in a resilient interference engagement. The connection of the reveal frame channel to the dado by way of the double-ended barbed connectors provides tolerance of dimensional variations in the frame and the dado because the connectors are flexible, but at the same time provides a rigid securement of the reveal frame to the main housing.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, the geometric center of the furniture article and designated parts thereof. Said terminology will include the words specifically mentioned, derivatives thereof, and words of similar import.

DETAILED DESCRIPTION

Figures 2, 3:
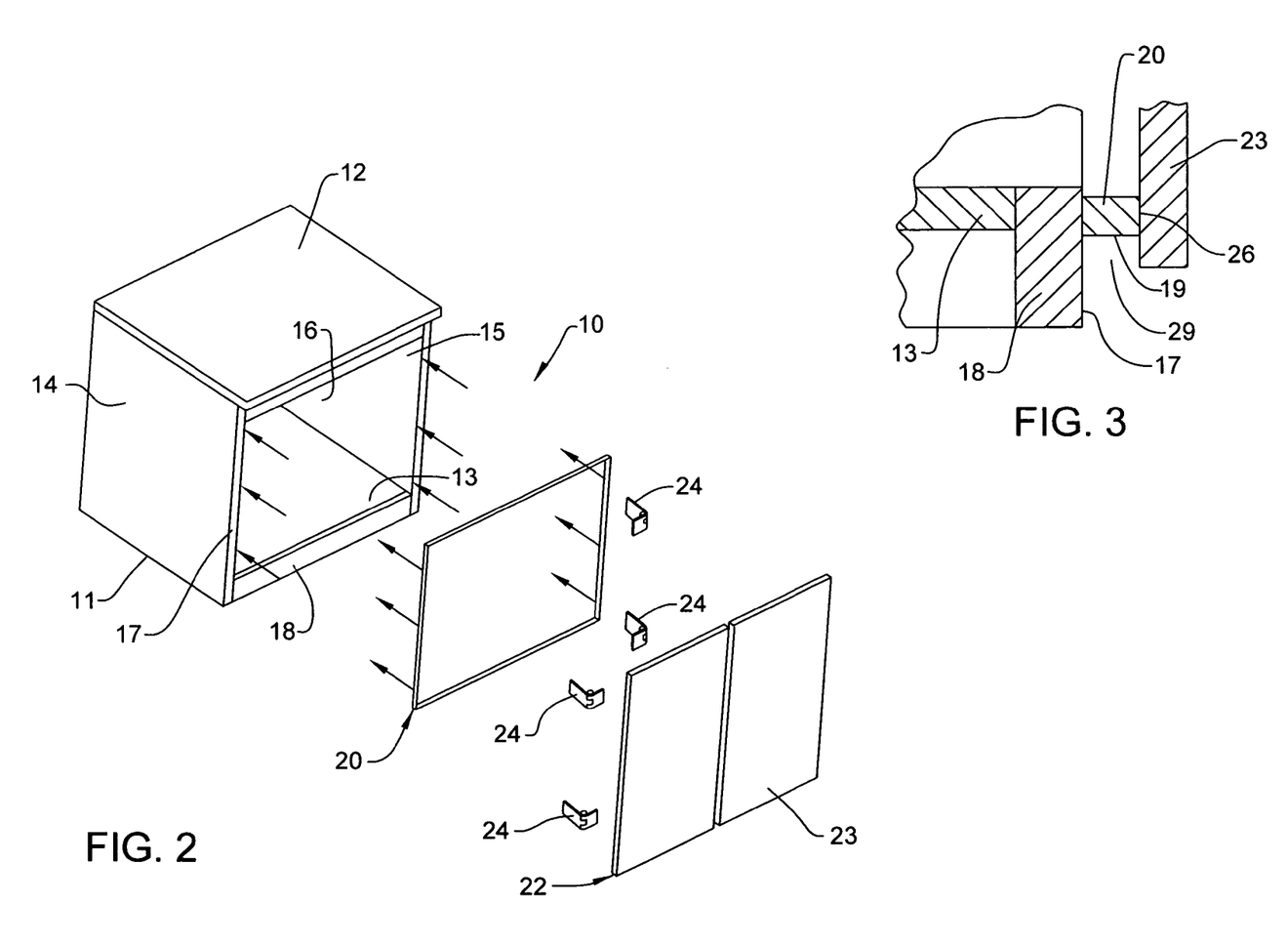
FIG. 2 is an exploded view of the article of furniture showing the cooperation of a reveal frame between the main housing of the article and the front panel, such as an openable door.
FIG. 3 is an enlarged, fragmentary sectional view taken generally along line 3-3 in FIG. 2 but shown with the front panel in a closed position.

Referring to FIGS. 2 and 3, there is illustrated an article of furniture 10 which has a reveal associated therewith. This furniture article 10 includes a main body or housing 11 which is defined by a generally open box-shaped cabinet having generally parallel top and bottom side walls 12 and 13 which are rigidly joined by right and left upright side walls 14 and 15. These walls cooperate to define an interior chamber 16 which opens through the front side of the cabinet. This opening is bounded by a generally rectangular ring-shaped front housing edge 17 which is defined by the front upright edges of the side walls 14 and 15, and is also defined by front surfaces associated with upper and lower portions of a front wall 18.

The cabinet 11 is provided with a reveal frame 20 fixed thereto, specifically to the ring-shaped front edge 17. This frame 20 is formed generally as an open ring-shaped rectangle which overlies the front edge 17 and is fixed thereto, typically by conventional fasteners such as screws or nails and/or adhesive.

The furniture article 10 also includes a movable front panel 22 which cooperates with the housing 11 so as to permit closure of the storage compartment 16. The front panel 22 in the illustrated embodiment comprises a pair of doors 23 which are appropriately connected to the cabinet 11, such as by conventional hinge mechanisms 24, so that the doors swingably move between closed positions wherein they effectively abut the reveal frame 20, and open positions wherein they are pivoted forwardly so as to provide access to the storage compartment 16.

As illustrated by FIG. 3, the front panels 22 or doors 23 when in the closed position are adapted to substantially abut against the front face 26 of the reveal frame 20 which maintains the front panels 23 spaced forwardly a small distance from the front edge surface 17. In addition, the reveal frame 20 has an outside dimension, such as defined by the outer peripheral side face 19, which is spaced inwardly from the outer edge of the front edge surface 17, and likewise the front panel 22 or door 23 is sized so that its outer edge protrudes beyond the outer surface 19 of the reveal frame 20. The reveal frame 20 and its disposition relative to the outer edge of the front panel 22, hence cooperate to define a channel-like recess or groove 29 which opens transversely outwardly in a direction parallel to the front edge surface 17 so as to provide access to the groove 29 from the adjacent outer edge of the front panel 22. For example, in the arrangement illustrated by FIG. 3, the positioning of the access groove 29, defined by the presence of the reveal frame 20, enables the fingers of a user to be inserted under the lower edge of the door 23 and upwardly into the groove 29 to hence enable gripping of the rear edge of the door to permit displacement of the door into its open position.

While FIG. 3 illustrates the reveal groove 29 being associated with the lower edge of the door 23, it will be appreciated that this reveal groove preferably is provided so as to extend horizontally along both the upper and lower edges of the doors 23, as well as along the upright side edges which are associated with the upright side walls of the cabinet 11.

Figure 16:
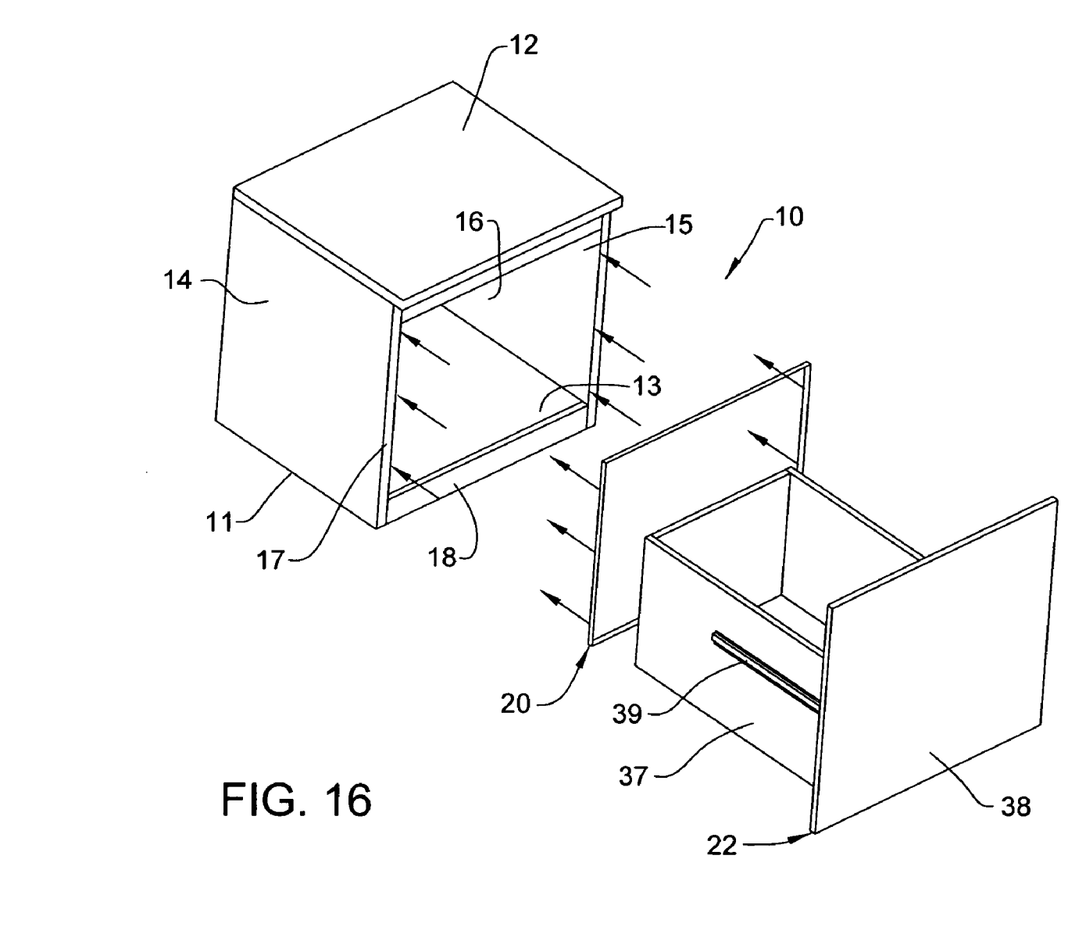
FIG. 16 is an exploded view of the article of furniture showing the cooperation of a reveal frame between the main housing of the article and the drawer affixed to the main housing via sliders.

Further, while the removable front support panel 22 in the illustrated embodiment in FIG. 2 is depicted as swingable doors 23, it will be appreciated from FIG. 16 that the movable front panel 22 may comprise the front panels 22 of slidable drawers 37, such as the front panel 38 of drawer 37, which drawers 37 are interconnected to the housing 11 through suitable support rails 39, so that the drawers 37 are movable between a closed position wherein the front panel 38 abuts the reveal frame 20, and an open position slidable displaced partially outwardly from the cabinet so that the front panel 38 is displaced forwardly away from the reveal frame 20.

The overall construction which has been briefly summarized above is known, and further detailed description thereof is believed unnecessary.

In accordance with the present invention, the reveal frame 20 is provided with an improved construction which facilitates the preassembly of the frame 20 into a rigid one-piece rectangular ring prior to its securement to the casing 11, and to an improved fastener arrangement which facilitates the efficient and cost-effective assembly of the frame 20 to the cabinet in a manner which not only results in proper securement of the frame 20 to the cabinet front edge, but which eliminates the need for using exposed fasteners such as screws and the like for effecting securement of the frame 20 to the cabinet.

Figure 4:
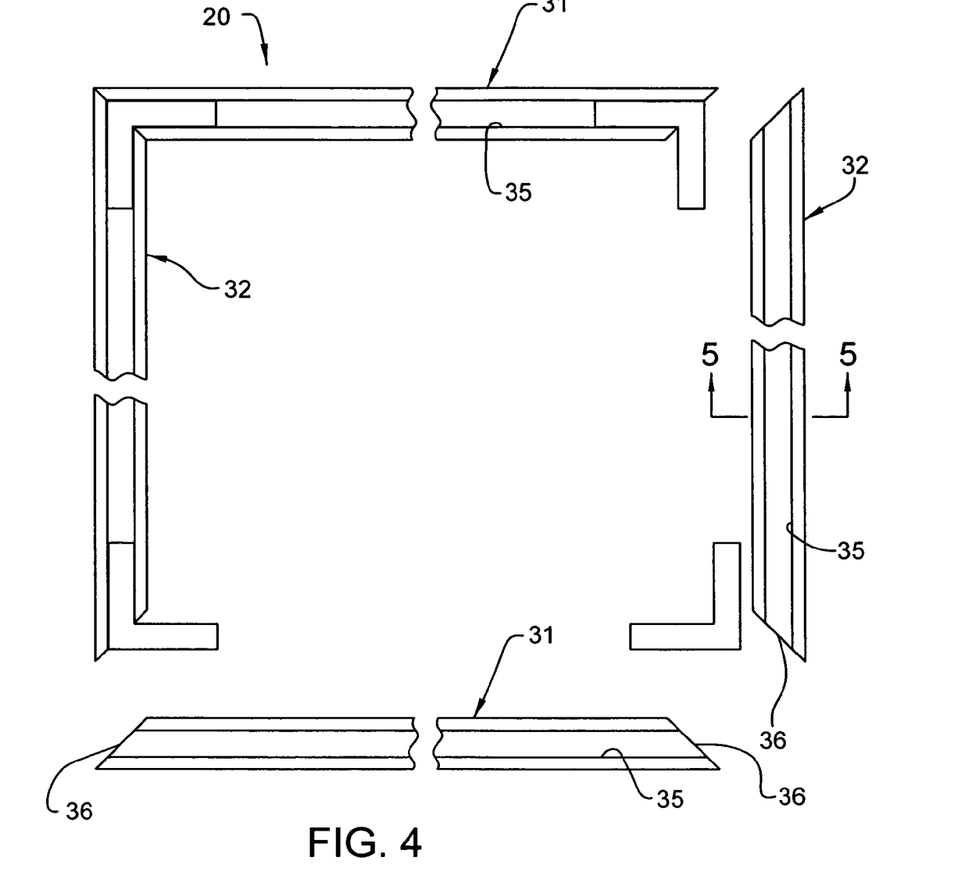
FIG. 4 is a partially exploded plan view of a reveal frame, taken from the rear side thereof, according to the present invention.
Figure 5:
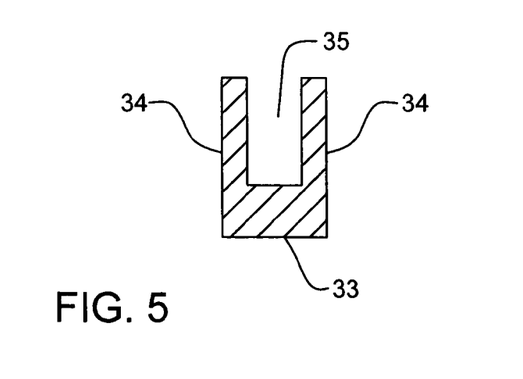
FIG. 5 is an enlarged cross-sectional view of the side element defining the reveal frame as taken generally along line 5-5 in FIG. 4.

Referring to FIGS. 4 and 5, there is illustrated the improved reveal frame 20 according to the present invention. The frame 20 is defined by generally parallel upper and lower frame rails 31 which are rigidly joined between generally parallel upright frame rails 32 so as to define a rigid one-piece ring-shaped frame of generally and preferably rectangular configuration. The frame elements 31 and 32 are identical in cross section, and may be of the same or dissimilar lengths depending upon the article of furniture with which the frame 20 is to be utilized. The opposite free ends of each frame element 31, 32 are provided with reversely-angled miters 36, preferably 45° miters, so that the mitered ends of each adjacent pair of frame elements 31 and 32 snugly abut so as to effectively define a right-angle corner.

Each frame element 31, 32, as illustrated by FIG. 5, preferably has a channel or U-shaped cross section defined by a front or base wall 33 which joins between a pair of generally parallel and cantilevered side legs or side walls 34. The base wall 33 and side walls 34 extend throughout the entire length of the respective frame element 31, 32, and cooperate to define a rearwardly opening groove or channel 35.

To assemble the frame elements 31 and 32 into the rigid rectangular frame 20, the mitered corners of the frame elements 31 and 32 are disposed in abutting contact, whereby the channel 35 hence itself defines a substantially endless groove or channel extending in a closed rectangular loop along the frame 20. Each corner of the frame 20 is rigidified by a one-piece L-shaped corner connector 40 which is pressed into the channels 35 of the frame rails 31 and 32 so as to extend across the mitered corner.

Figure 6:
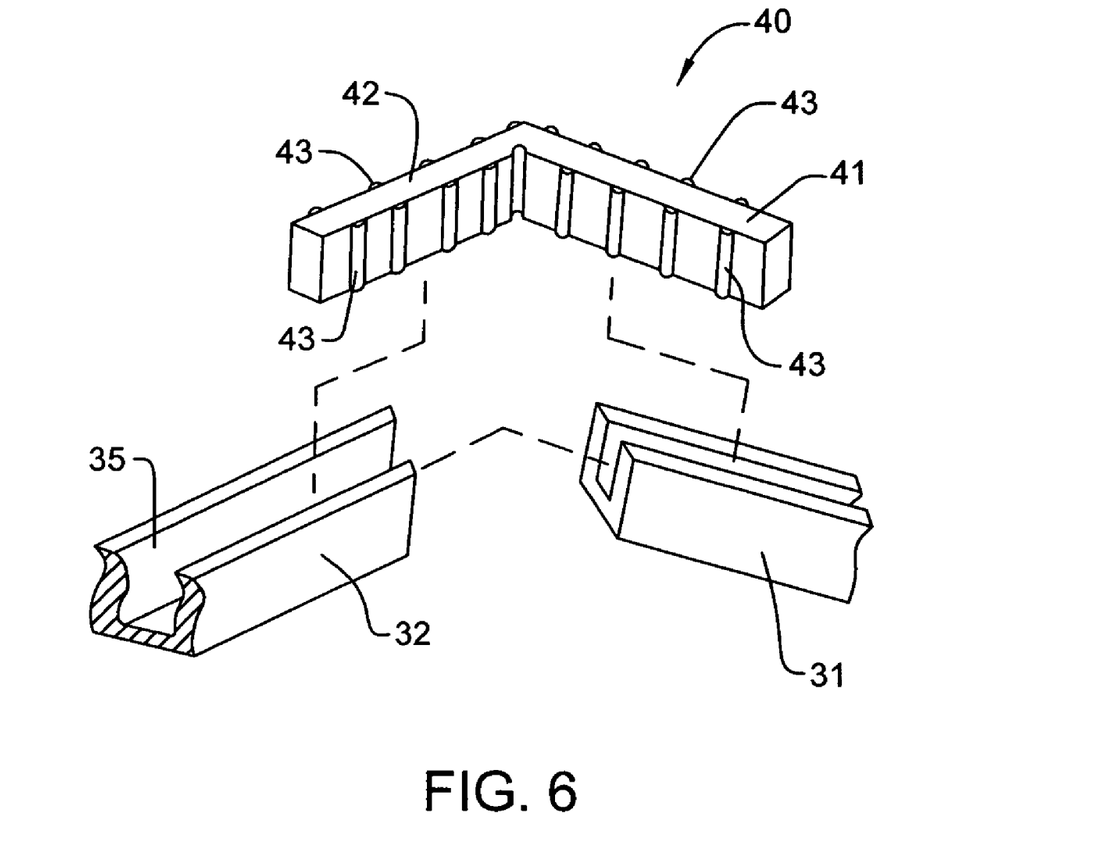
FIG. 6 is a fragmentary exploded view showing one corner of the reveal frame.
Figure 7:
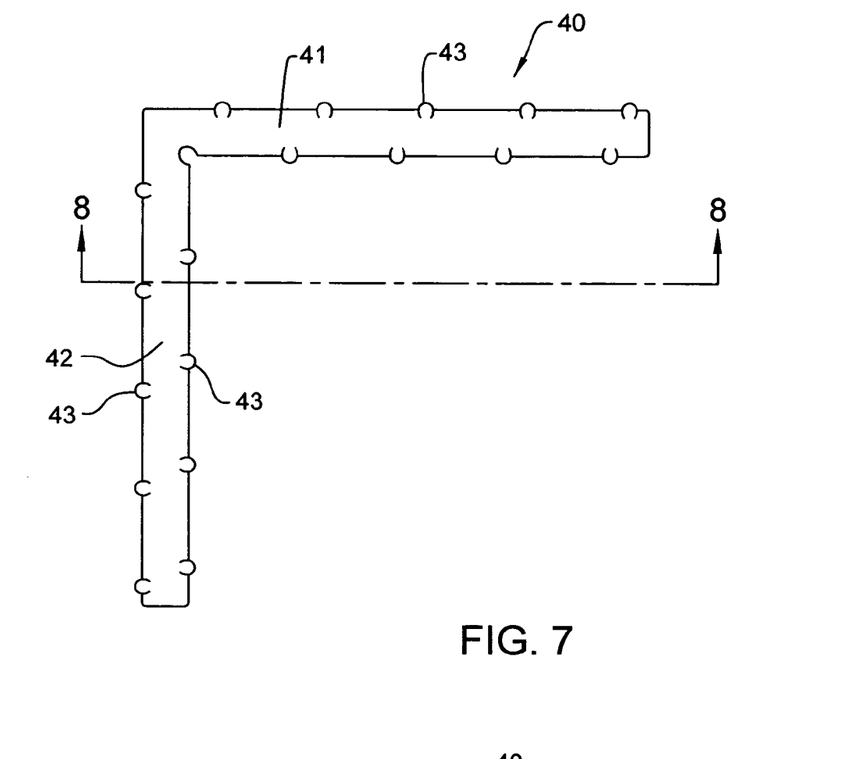
FIG. 7 is a plan view of the corner key used for securing adjacent side elements of the reveal frame according to the present invention.
Figure 8:
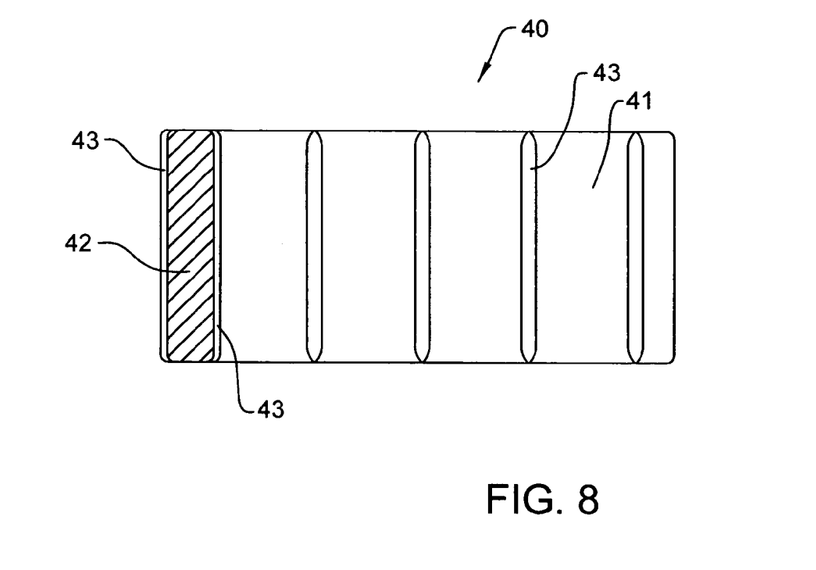
FIG. 8 is a sectional view taken generally along line 8-8 in FIG. 7.

The corner connector 40, as shown by FIGS. 6-8, is L-shaped and includes a pair of rigid legs 41 and 42 which protrude in perpendicular relationship from the mutual corner where they intersect, the legs 41 and 42 typically and preferably being of the same cross section and length. Each of the legs 41 and 42 has, on the opposite upright side walls thereof, namely the outer and inner side walls, a plurality of protrusions 43 which are provided so as to effect a positive gripping, such as a pressure or interference fit, with the frame rails 31 and 32. These protrusions 43 in the illustrated embodiment comprise small ribs which protrude outwardly from the side wall of the leg and extend transversely thereacross. The ribs preferably are of rounded cross section resembling a semicircle. A plurality of such ribs are disposed in spaced relationship from one another lengthwise along each of the inner and exterior side walls of each leg.

Figure 9:
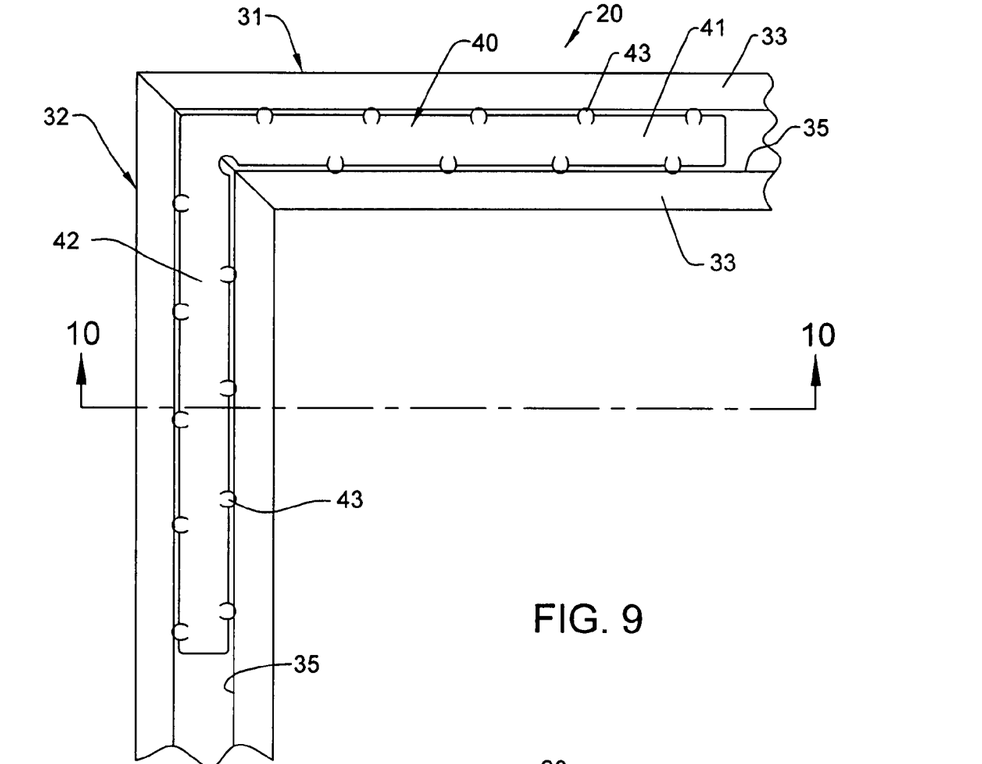
FIG. 9 is a fragmentary plan view, taken from the rear side, and showing one corner of the assembled reveal frame.

The corner connector 40 is press fit into the channel 35 associated with the abutting rails 31 and 32, substantially as illustrated by FIG. 9, so as to span across the mitered corner and hence create a rigid corner structure for the frame. The width of the legs 41 and 42 relative to the width of the channel 35, is such that these legs will be insertable into the channels, but the protrusions 43 will effectively create an interference fit with the side walls 34 of the frame elements 31 and 32. The engaging ribs 43 as associated with the inner and outer side walls of each leg 41 and 42 are, as illustrated by FIGS. 7 and 9, preferably staggered or offset in the lengthwise direction of the legs so as to ensure that the corner connector and the frame rails achieve a desired rigid press fit therebetween, without at the same time creating unnecessary binding which might occur if the ribs on opposite side walls of the legs were transversely aligned.

To achieve a desirable cooperation between the frame rails 31, 32 and the corner connectors 40, the edge rails 31, 32 and the corner connector 40 may be constructed of different materials. For example, the edge rails 31, 32 may be aluminum, preferably extruded, whereas the corner connectors 40 may be of steel, thereby facilitating the distortion of the aluminum edge rails along the inside surfaces thereof when engaged with the protrusions 43 associated with the corner connector 40. In addition, the legs 41, 42 of the corner connector 40 may be provided with a slight converging taper between the side walls, such as a taper of approximately 1°, as the side walls protrude from top to bottom so as to further facilitate the insertion of the corner connector into the edge rail channels 35 and hence create the desired press or interference fit. As an alternative, the converging taper may be provided on the inner surfaces of the edge rail side legs 34 as the inner surfaces project inwardly away from the mouth of the channel 35.

To effect connection of the frame 20 against the front edge surface 18 of the furniture article, a plurality of double-ended barbed connectors or fasteners 50 (FIGS. 10 and 11) are disposed so as to connect to the frame 20 at spaced intervals there along. More specifically, preferably at least two such barbed connectors are engaged within the channel 35 of each frame element 31, 32 in spaced relationship to one another along the respective frame element 31, 32, with the barbed connectors having one end protruding outwardly from the frame 20 for engagement with a suitable recess or groove 29 formed in the furniture article, as explained hereinafter.

Figure 10:
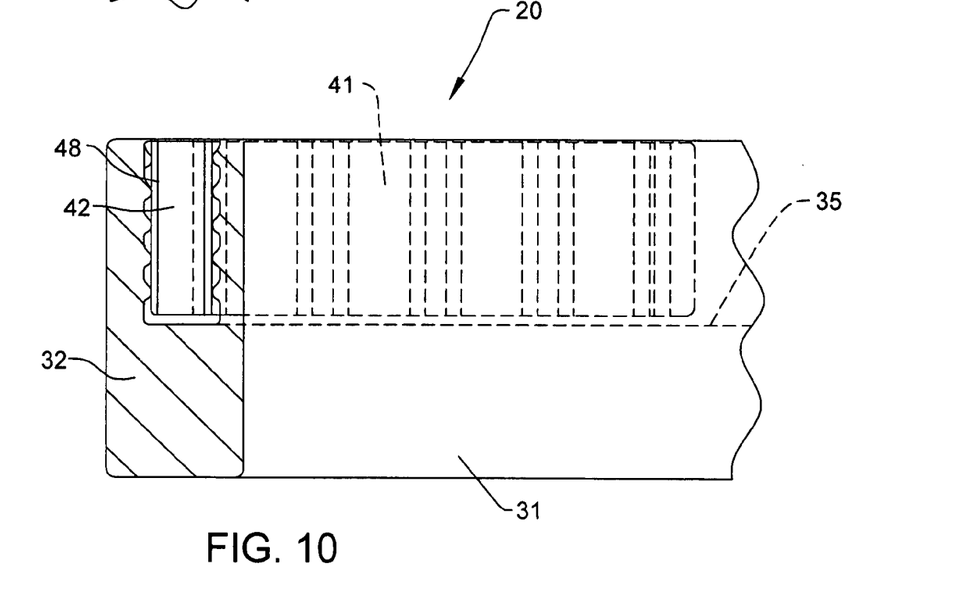
FIG. 10 is a sectional view taken generally along line 10-10 in FIG. 9.

A preferred construction of the double-ended barbed connector 50 is shown in FIG. 10. This connector 50 is defined generally by a flat plate, an end view of which is shown in FIG. 10, the plate being elongated (perpendicular to the paper in FIG. 10) so that the connector will engage the frame element channel 35 over a significant length. The barbed connector 50 has barbed end portions 53 joined by a center portion 52, the latter being defined generally by a flat plate which extends lengthwise of the connector. The barbed end portions 53 are, in the illustrated embodiment, substantially identical to one another but are substantially mirror images about a transverse centerline of the connector.

Each barbed end portion 53 includes a generally arrow-shaped end 56 defined at the respective end of the center plate, which arrow 56 effectively includes barbs 55 which extend lengthwise along opposite sides of the main plate 52. The barbs 55 on the outer surface slope inwardly and merge at a peak 57 which extends lengthwise of the connector. The barbed end portion 53 also includes one or more additional pairs of barbs 54 which are spaced inwardly from the arrow 56 and protrude outwardly from opposite sides of the main plate 52 and extend lengthwise therealong. The barbs 54, like the barbs 55, have a bottom surface which protrudes outwardly approximately perpendicularly relative to the center plate 52, whereas the outer surface of the barb has a greater slope, whereby each barb effectively tapers to a pointed outer edge as it protrudes outwardly away from the side of the main plate 51.

The connector 50 is preferably constructed of a plastics material having a fairly high durometer so as to possess significant stiffness, but at the same time permit resilient deformation when the connector is subjected to external forces of sufficient magnitude. For example, the outwardly protruding barbs 54 and 55 can resiliently deflect when sufficient force is applied to the barbs in the vicinity of the free edges thereof. Further, the flat center portion 52 connecting the ribbed end portions 53 is also capable of undergoing at least a small amount of resilient deflection so as to enable the opposite barbed ends 53 to be properly engaged within channels or recesses which do not always perfectly align.

In the preferred construction of the barbed connector 50 according to the present invention, the transverse widths or dimensions between the tips of the outermost barbs 55 is preferably slightly less than the tip-to-tip transverse dimension between the middle pair of barbs 54, which latter dimension if preferably slightly less than the tip-to-tip transverse dimension between the tips of the innermost pair of barbs 54. The transverse or width dimensions of the barbs as they project inwardly away from the tip or peak 57 defined at the free end hence progressively increases, thereby facilitating the progressive insertion of the barbed end into the frame element channel 35 while at the same time progressively increasing the gripping of the barb to the channel walls so as to optimize the gripping engagement between the barbs and the channel walls when the barbed end is fully inserted into the channel 35.

Figure 11:
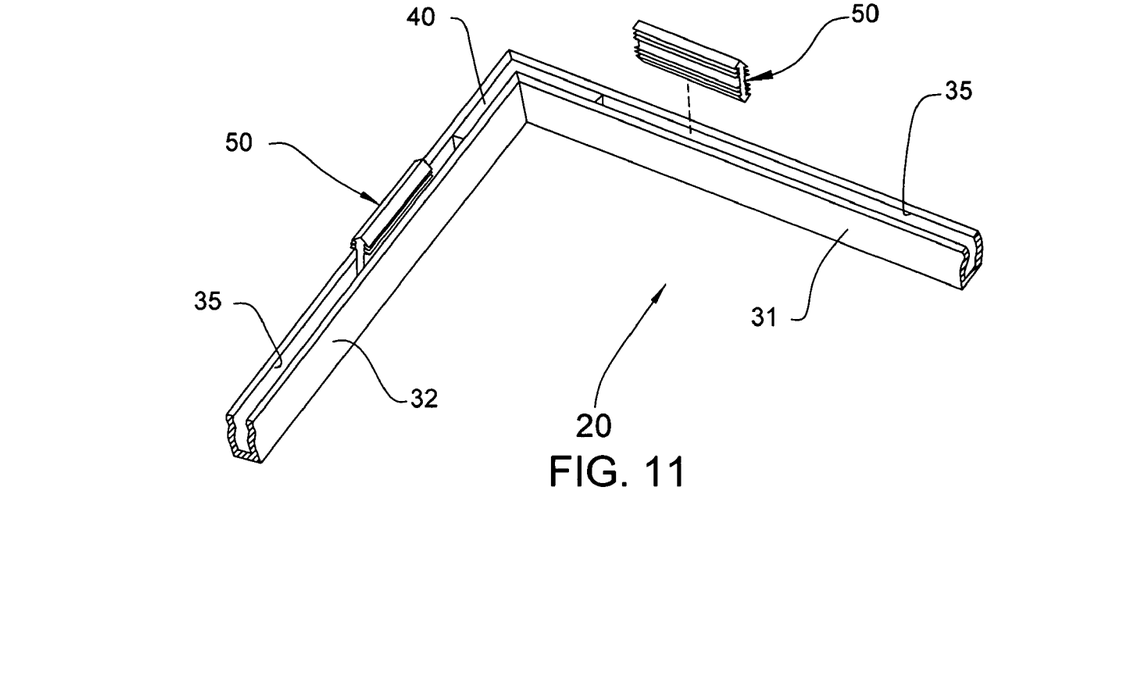
FIG. 11 is a fragmentary perspective view showing a part of the assembled reveal frame, and illustrating its cooperation with double-ended barbed connectors which join the frame to the main body of the furniture article.
Figure 12:
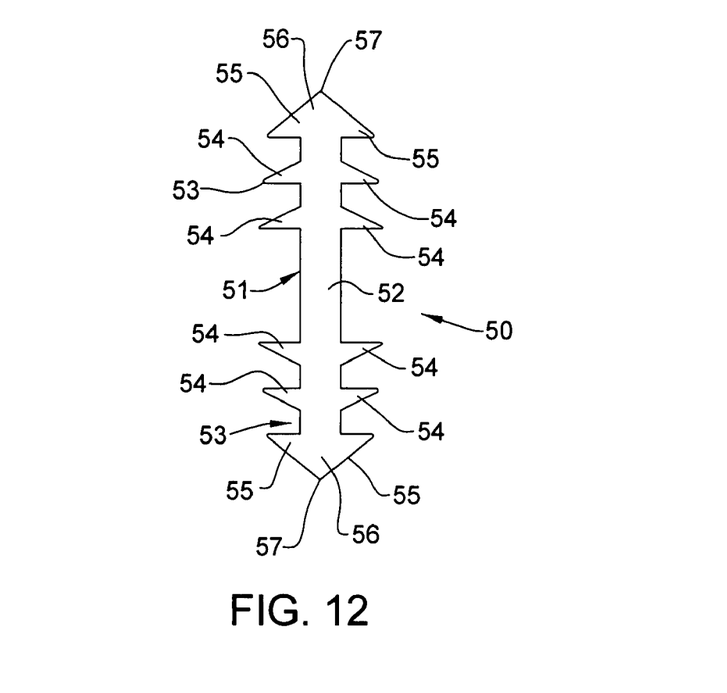
FIG. 12 is an end view illustrating the double-ended barbed connector used for joining the reveal frame to the article body.

After the reveal frame 20 has been assembled using the corner connectors 40 as described above, then the plurality of fasteners 50 can be assembled to the frame 20 by individually inserting one barbed end of each fastener 50 into the channel 35 of the frame element 31, 32 in the manner illustrated by FIG. 11. All of the connectors 50 can hence be mounted to the frame 20, prior to assembly of the frame 20 30 to the furniture article, whereby the frame when assembled with the connectors 50 hence results in each connector 50 having one barbed end protruding outwardly from the rear of the frame for subsequent engagement with a suitable channel or recess formed in the furniture article.

To accommodate the protruding barbed ends of the connector 50 mounted on the frame 20, the article of furniture 11 preferably has a channel 61 (FIG. 13) formed inwardly from the ring-shaped rectangular front edge surface 18 of the furniture article. This channel 61 preferably extends vertically along opposite sides of the access opening and horizontally along the upper and lower edges of the access opening, being spaced outwardly from the opening edges, whereby the channel 61 formed in the front edge surface 18 hence preferably has a closed ring-shaped rectangular profile which approximately corresponds to the profile defined by the channel 35 associated with the frame 20. Further, the channel 61 preferably has a width which generally corresponds to the width of the frame channel 35.

Figure 13:
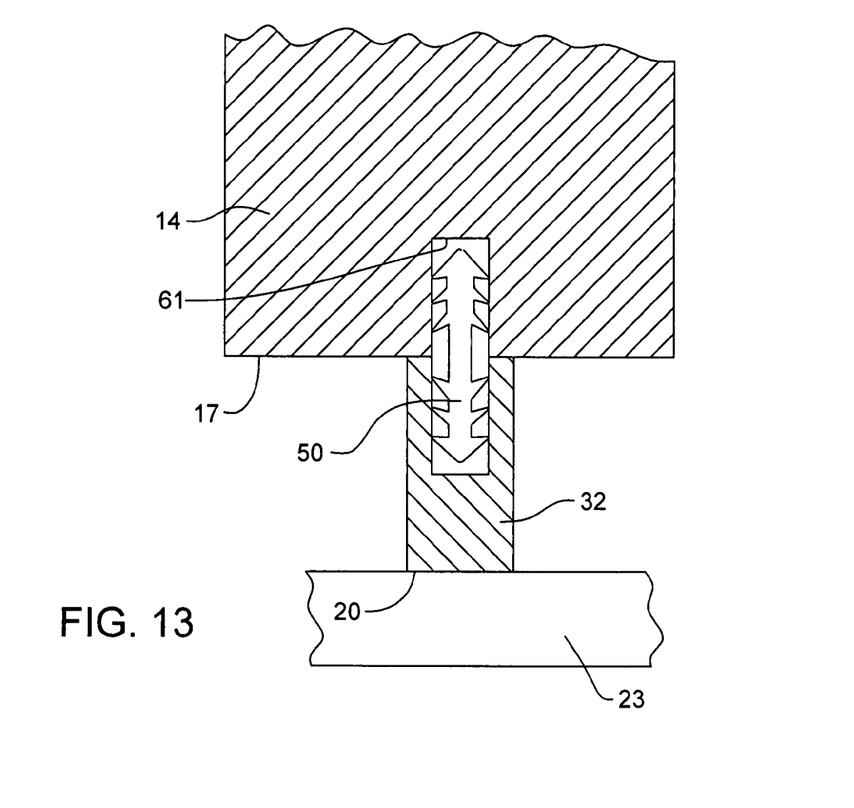
FIG. 13 is a cross-sectional view illustrating the manner in which the reveal frame is secured to the article body by means of the double-ended barbed connector.

To assemble the preassembled frame arrangement to the furniture article, the frame 20 is moved toward the front edge surface 17 so that the protruding barbed ends of the connectors 50 align generally with the channel 61. The frame 20 is then pressed rearwardly toward the front edge surface 17 so that the protruding barbed ends of the connectors 50 are forced into the channel 61, whereupon the barbs 54 and 55 as associated with the protruding ends of the connectors 50 are resiliently deformed and hence effect a secure gripping engagement with the side walls of the channel 61. The frame hence is pressed inwardly toward the article of furniture until the rear of the frame 20 substantially abuts the front edge surface 17, thereby ensuring maximum insertion of the barbed ends of the connectors 50 into the channel 61, and thus rigidly joining the reveal frame to the front edge surface of the furniture article.

Since maintaining precise dimensional tolerances and hence providing identity and true alignment of the channels of the ring-shaped channels 35 and 61 is normally not technically feasible, at least from an economical manufacturing standpoint, the flexibility associated with the barbed ends of the connectors 50, and more significantly the resilient flexibility associated with the center plate portion 52 which joins the opposite barbed end portions of the connectors, permits the opposite barbed ends of each connector to be slightly resiliently distorted and hence misaligned so as to compensate for dimensional variations or misalignment between the channels 35 and 61, while at the same time ensuring that the reveal frame 20 is positively fixedly secured in a desired positional relationship so as to abut the front edge surface 17 of the furniture article.

With the improved reveal frame construction as described and discussed herein, the resulting reveal frame 20 when fixedly joined to the furniture article provides a sidewardly opening clearance channel or groove 29 inasmuch as the exterior side of the frame element, such as the side designated 36 in FIG. 13, is spaced inwardly from an outer edge of the front surface 17. Further, since the front panel 22 of the furniture article, which panel is indicated by dotted lines in FIG. 13, has an outer edge which is substantially coextensive with the outer edge of the front edge surface 17, the frame 20 hence cooperates to define the sidewardly opening channel or groove 29 which provides not only desired visual aesthetics, but also functions as a finger-accommodating groove so that the fingers can engage a rear edge of the front panel 22 so as to permit opening of a door 23 or drawer 37. This hence enables the front or exposed surface of the door 23 or drawer 37 to be free of pulls or other equivalent hardware.

Figure 14:
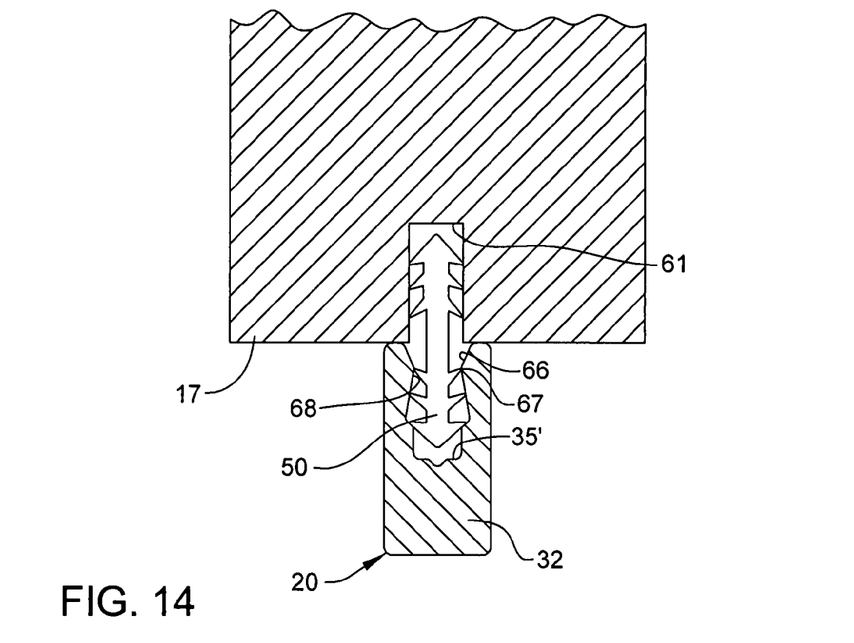
FIG. 14 is a view similar to FIG. 13 but illustrating a first alternate embodiment of the configuration of the channel formed in the reveal frame.

Referring to FIG. 14, there is illustrated a view similar to FIG. 13 except that there is shown a first variation of the channel 35' formed in the frame rail 31, 32. In this variation, the opposite side walls of the channel 35' include opposed wall portions 66 which converge inwardly away from the mouth of the channel until reaching a peak 67, following which the opposed side walls of the channel thereafter taper outwardly from one another as they project toward the closed end of the channel. The peak 67 hence effectively creates the narrowest point as the barbed end is inserted into the channel. The converging or flared mouth defined by the walls 66 initiates resilient deflection of the barbs which, after the peak or constriction 67, move into the diverging walls 68 so that the barbs will partially resiliently deflect back toward their original shape. This constriction or ridge 67 hence effectively acts as an obstruction which, while allowing insertion of the barbs there past into the bottom of the channel 35', effectively prevents withdrawal of the barbs back out of the channel, at least without application of excessive withdrawal force.

Figure 15:
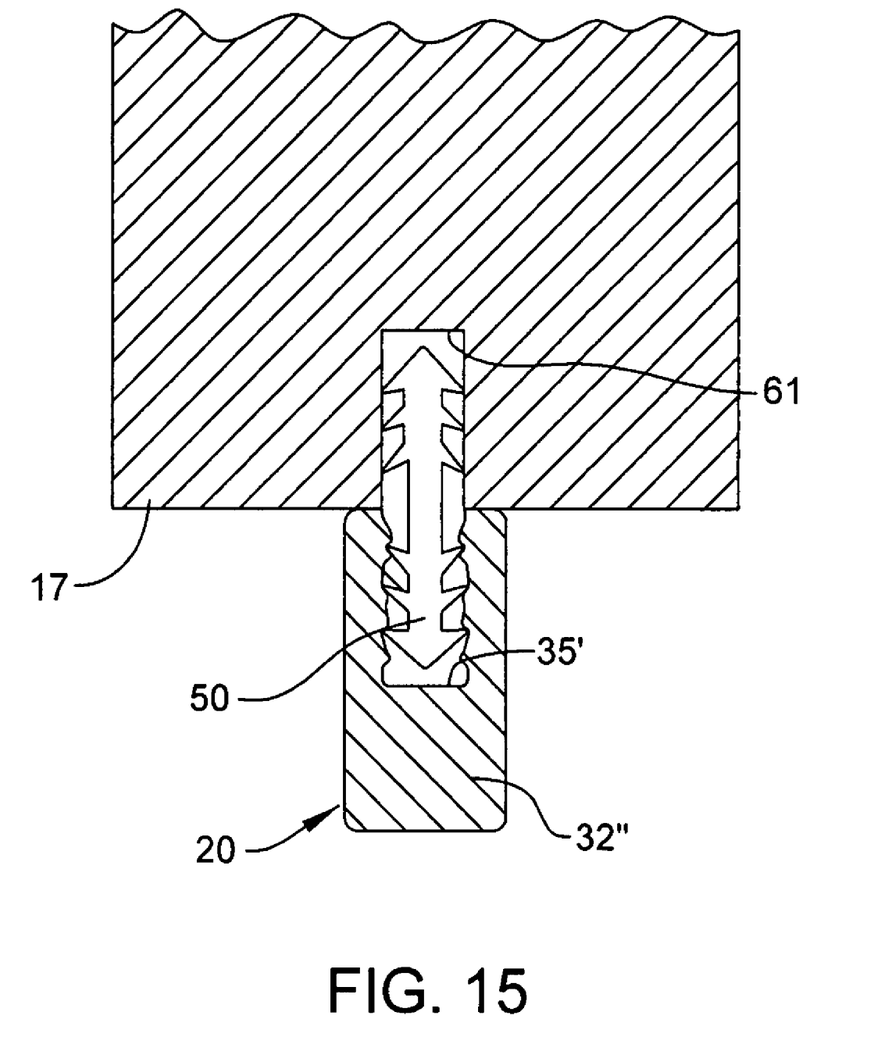
FIG. 15 is a cross-sectional view of a second alternative embodiment showing a further variation of the channel configuration formed in the reveal frame.

FIG. 15 is a further view similar to FIG. 13 and illustrates a further alternate construction of the channel 35' associated with the frame elements 31, 32. In this variation, the opposed side walls of the channel are effectively defined with a plurality of sidewardly adjacent shallow ribs and grooves extending lengthwise along the channel, thereby providing each side of the channel with a generally corrugated configuration in the direction of the channel depth. This corrugated configuration again effectively causes initially a greater degree of resilient deflection of the barbs 54, 55 during insertion, with the deformation of the barbs being partially resiliently relieved when the barbs engage within the shallow grooves. This corrugated configuration of the channel side walls, however, again affectively creates a construction which readily permits the barbed end to be inserted into the channel without exertion of undo force, but the corrugated side wall functions similar to a one-way lock in that it prevents withdrawal of the barbed end of the connector accept in situations where an excessive withdrawal force is applied to the connector. This wall configuration associated with the channel formed in the frame elements, similar to the function achieved by the wall construction illustrated in FIG. 14, hence provides significantly increased holding of the barbed end of the connector within the channel defined by the frame elements, and accordingly facilitates not only the initial assembly of the reveal frame and its subsequent assembly to the furniture article, but also greatly minimizes any risk of the reveal frame being either loosened or dislodged from the furniture article.

Although the present invention has been illustrated in terms of an exemplary embodiment, it would be understood by those of ordinary skill in the art that various changes and modifications may be made with respect to the illustrated embodiment without departing from the spirit and scope of the present invention.

What is claimed is:
1. A furniture article comprising:
 a main body having a front end with an opening formed therein and a peripheral face surrounding the opening, and a ring-shaped channel formed vertically and horizontally in the peripheral face in surrounding relation to said opening and open to the front end of said main body;
 a ring-shaped reveal frame affixed to the peripheral face in overlying and covering relation to said channel;
 a front panel movably connected to the main body and disposed to overlie the reveal frame;

the reveal frame defining therein a rear-opening channel having vertical and horizontal sections which said channel communicates with and overlies the channel in said main body when the reveal frame overlies the peripheral face; and a plurality of double-ended barbed monolithic fasteners engaged at selected spaced locations along the lengths of the frame channel and main body channel and having opposite ends thereof resiliently gripped with the frame channel and the main body channel respectively.

2. The furniture article of claim 1, wherein the front panel comprises a door hingedly connected to the main body.

3. The furniture article of claim 1, wherein the front panel comprises a drawer affixed to the main body via sliders.

4. An article of furniture, comprising:

a box-shaped housing defining therein an interior compartment, said housing having a front side provided with a generally rectangular access opening therethrough which communicates with said interior compartment, said front side defining thereon a generally rectangular ring-shaped front face which exteriorly surrounds said access opening;

a preassembled, rigid, ring-shaped rectangular frame positioned in abutting engagement with said front face in surrounding relationship to said access opening, said frame protruding outwardly from said front face and having peripheral exterior sides which are positioned in inwardly spaced relation from a respectively adjacent peripheral exterior edge of said front face;

said frame being defined by top horizontal, bottom horizontal, right vertical and left vertical elongate frame elements, said frame elements having adjacent ends abutting to define a frame corner, said frame elements adjacent each said corner having grooves opening inwardly from backsides thereof, and a rigid L-shaped corner member associated with each frame corner and fixedly seated within the respective grooves for rigidly joining the adjacent horizontal and vertical frame elements at the corner, each said corner member being totally enclosed within the grooves so as to be hidden from the front side of the frame;

a monolithic fastener fixed to each said frame element and having a rear portion which protrudes in a cantilevered fashion rearwardly away from the back side of said frame element, said protruding rear portion of the fastener being constructed of a plastics material having at least limited resiliency to permit the protruding rear portion to have at least limited transverse deflectability relative to the respective frame element, and resiliently deformable barbs protruding sidewardly from said rear portion in spaced relationship thereon;

a plurality of recesses opening inwardly from said front face, one of said recesses being associated with and disposed closely adjacent one peripheral edge of the access opening, and a respective one of the protruding rear portions associated with a respective said fastener being inserted into the respective recess so that recess with the barbs being deformed and maintained in stationary gripping engagement with walls defining the respective recess to hold the frame in abutting contact with the front face so that the frame protrudes outwardly therefrom; and a front panel arrangement movably supported on the housing for movement between a closed position wherein the front panel arrangement overlies the access opening, and an open position wherein the front panel is movably displaced to at least partially allow access to the access opening, said front panel arrangement when in said closed position directly overlying said frame in substantially abutting contact with a front face of the frame, said front panel arrangement having edge parts which protrude sidewardly beyond the exterior peripheral side of the frame and cooperate with the frame and the front face to define a circumferential reveal groove which opens sidewardly of the furniture article.

5. A furniture article according to claim 4, wherein the groove associated with each said frame element extends lengthwise throughout the length thereof, and wherein said fastener has a second end portion which is constructed of an elastomeric material and provided with deflectable barbs, said second end portion being oriented to protrude from an end of said fastener opposite said first-mentioned end portion, said second end portion being inserted into the channel of the respective frame element so as to be deformed and effect gripping engagement with side walls of the channel.

6. A furniture article according to claim 5, wherein each L-shaped corner member has ribs thereon which create a deformable interference fit with side walls of the channel to effect fixed seating of the corner member within the channels of the frame elements and to create a rigid fixed interconnection between the frame elements at the frame corner.

7. An article of furniture according to claim 5, wherein the fastener includes a main plate-like body constructed of a stiff plastics material, said body having a length which extends parallel to the channel and which is greater than the width of the body which extends outwardly relative to the channel, the first-mentioned end portion being defined along one edge of the main body with the respective barbs being disposed on opposite sides of the main body and extending lengthwise relative to the free edge thereof, and the other end portion being defined adjacent the other edge of said main body which is positioned within the channel of the respective edge member, the barbs associated with said other edge also being positioned adjacent and extending lengthwise generally parallel to said edge.

8. A furniture article according to claim 7, wherein said main body includes a generally flat platelike portion which is positioned between said first and second end portions and extends throughout the length of the fastener, said center portion permitting relative flexible bending so that the first and second end portions can be sidewardly displaced with respect to one another.

9. A furniture article according to claim 8, wherein each L-shaped corner member has ribs thereon which create a deformable interference fit with side walls of the channel to effect fixed seating of the corner member within the channels of the frame elements and to create a rigid fixed interconnection between the frame elements at the frame corner.

10. An article of furniture according to claim 8, wherein the grooves formed in the front face of the housing extend lengthwise along and generally parallel with the respectively adjacent peripheral edge of the access opening, said grooves as associated with the four peripheral edges of the access opening being interconnected adjacent the corners of the access opening so that the grooves define a continuous groove which encircles the access opening and has a generally rectangular ring-shaped configuration.

11. A furniture article according to claim 4, wherein said front panel arrangement comprises one or more upright door panels which overlie and close off said access opening when in said closed position, each said upright door panel being hingedly connected to said housing to permit the door to swing horizontally between closed and opened positions.

12. A furniture article according to claim 4, wherein said front panel arrangement includes one or more drawer fronts each associated with an upwardly-opening drawer which is mounted for generally horizontal sliding movement relative to said housing, each drawer being positioned within the compartment when the respective drawer front is in the closed position, the drawer projecting at least partially outwardly through the access opening when the respective door front is in an open position wherein it is spaced horizontally forwardly away from the frame.

13. The furniture article of claim 1, wherein said fasteners having elongate, opposite side faces which abuttingly, frictionally engage corresponding portions of opposed interior side faces of said frame channel and said main body channel, said fasteners being selectively engagable at any location along the lengths of said frame channel and said main body channel.

* * * * *